United States Patent
Ängquist

[11] Patent Number: 5,801,459
[45] Date of Patent: Sep. 1, 1998

[54] CONTROL EQUIPMENT FOR A SERIES CAPACITOR CONNECTED INTO AN ELECTRIC POWER LINE

[75] Inventor: Lennart Ängquist, Enköping, Sweden

[73] Assignee: Asea Brown Boveri AB, Västerås, Sweden

[21] Appl. No.: 443,308

[22] Filed: May 17, 1995

[30] Foreign Application Priority Data

May 30, 1994 [SE] Sweden ................... 9401845

[51] Int. Cl.$^6$ ................... H02J 3/24
[52] U.S. Cl. ................... 307/125; 307/102; 323/211
[58] Field of Search ................... 323/205, 206, 323/207, 208, 209, 210, 211; 307/102, 103, 104, 105, 125

[56] References Cited

U.S. PATENT DOCUMENTS

| | | | |
|---|---|---|---|
| 5,202,583 | 4/1993 | Larsen | 307/102 |
| 5,227,713 | 7/1993 | Bowler et al. | 322/58 |
| 5,367,197 | 11/1994 | Klerfors | 307/105 |
| 5,374,853 | 12/1994 | Larsen et al. | 307/102 |

FOREIGN PATENT DOCUMENTS

| | | |
|---|---|---|
| 0571642A1 | 5/1992 | European Pat. Off. |
| 446289 | 1/1980 | Sweden |
| 465596 | 9/1991 | Sweden |

*Primary Examiner*—William M. Shoop, Jr.
*Assistant Examiner*—Jonathan S. Kaplan
*Attorney, Agent, or Firm*—Watson Cole Stevens Davis, P.L.L.C.

[57] ABSTRACT

Control equipment (CE) for a series capacitor (1) connected into an electric power line (2) has a semiconductor valve (3), which is controllable in both directions, for connection in parallel with the capacitor. An inductor (4) is adapted to form, together with the capacitor, an oscillation circuit in which the semiconductor valve is included. The equipment has control members (PLL, TC) for firing the semiconductor valve for reversal of the capacitor charge and for control of the times ($t_p$) for the zero crossings of the capacitor voltage ($u_c$) such that these become substantially equidistant also in the presence of subsynchronous components in the power line current.

13 Claims, 9 Drawing Sheets

CONTROL EQUIPMENT FOR A SERIES CAPACITOR CONNECTED INTO AN ELECTRIC POWER LINE

TECHNICAL FIELD

The present invention relates to control equipment for a series capacitor connected into an electric power transmission line, the equipment having a semiconductor valve, which is controllable in both directions, for connection in parallel with the capacitor, an inductor arranged in series with the capacitor and the semiconductor valve, forming an oscillating circuit together with the capacitor, and control members adapted to influence the firing times of the semiconductor valve for controlling the capacitor voltage.

BACKGROUND ART

In electric power networks, which comprise thermal power generating units (turbo-generators) and series-compensated transmission lines, non-damped and negatively damped oscillations may occur at a certain unfavourable degree of compensation. Such oscillations arise through cooperation between on the one hand the electrical system and on the other hand mechanical torsional oscillation modes with low damping in the shaft system of the turbine-generator units. The phenomenon is referred to as subsynchronous resonance (SSR).

SSR occurs in normal plants for production of thermal electric power at the frequencies $f_m$ in the mechanical system, and $f_N-f_m$ in the electrical system, where $f_N$ is the system frequency of the power network—normally 50 Hz or 60 Hz—and where in typical plants $15\ Hz < f_m < 45\ Hz$ Normally, within this frequency range, three to five different mechanical resonance modes with varying mechanical damping occur in each generator-turbine unit.

SSR oscillations have proved to lead to such great stresses in the shaft systems that permanent damage or total breakdown arises. Several methods for damping or for avoiding SSR have therefore been proposed.

Thus, it is known, for example from Swedish published patent application 446 289, to arrange damping resistors which are permanently connected or which are switched in when SSR are detected. Such resistors, however, will have large dimensions and possibly also a high power consumption and are therefore expensive and space-demanding.

It has therefore been proposed to design the series capacitor controllable and controlling it in such a way that a damping of SSR is obtained. From Swedish published patent application 465 596 such series capacitor equipment is previously known. The equipment has measuring and filtering members adapted to detect the occurrence of an SSR oscillation and to form a quantity corresponding to the SSR oscillation. This quantity is supplied to control members adapted to control the semiconductor valve in such a way that a damping of SSR oscillations arising is obtained. In this way, in principle, a damping of SSR oscillations, free of losses, may be achieved, and this only by a suitable design of the control members of the series capacitor. In practice, however, it has proved to be difficult to isolate an SSR component from measured operating quantities of the power line or the capacitor in an acceptable way, since this component should be capable of being detected even at a low level. An additional difficulty is that the frequencies of all the oscillating modes for subsynchronous oscillations, which may become critical at some connection state (a certain configuration of the lines) in the network, must be known in advance. Critical modes depend on which lines are connected or disconnected, which generators are connected, and which series capacitors are connected at a certain time.

U.S. Pat. No. 5,202,583 describes a device of the kind stated in the introductory part of this specification for fast fine control of a series capacitor connected into a power line. By a predicting control of the firing times of the semiconductor valve, a desired addition to the capacitor voltage may be rapidly set and maintained. The described system is probably capable of damping such subsynchronous electric oscillations which are caused by transient phenomena. However, the system becomes dependent on a plurality of internal and external parameters and cannot, therefore, under the operating conditions which are often varying in practice, effectively prevent the occurrence of subsynchronous resonance oscillations (SSR oscillations).

European patent application with publication number 0 571 642 describes a thyristor-controlled series capacitor which may be bridged by a surge arrester or by an electric switching device. The publication describes how an internal synchronization signal for control of the thyristors may be obtained and maintained also in case of a bridged state of the capacitor.

SUMMARY OF THE INVENTION

The invention aims to provide simple and, in principle, lossless equipment of the kind described in the introductory part of the description, which efficiently damps or completely prevents subsynchronous resonances independently of variations in the operating conditions or network data, and which at the same time makes possible a control of the effective impedance of the series capacitor at the system frequency, which is independent of the SSR oscillation.

In equipment according to the invention, the semiconductor valve is controlled in such a way that the apparent impedance of the series capacitor equipment within the whole range in which SSR oscillations may occur becomes inductive instead of capacitive. It has been found that this can lead to SSR oscillations being effectively damped or completely eliminated.

This is achieved according to the invention by controlling the semiconductor valve in such a way that the zero crossing of the capacitor voltage remain equidistant during processes when the line current contains, besides its fundamental component, subsynchronous components. In this way, the series capacitor equipment will systematically exhibit an inductive character within the whole frequency range which is of interest for SSR, and this is true independently of the control state of the capacitor, independently of the characteristics of the power line or the power network, and independently of the magnitude of the fundamental component of the current in the power line.

In one embodiment of the invention, the control members comprise a command-signal-generating member, preferably a phase-locked circuit synchronized to the power line current and adapted to supply equidistant command signals which are substantially independent of SSR components and which are used as reference when initiating the firing of the semiconductor valve. Each firing of the semiconductor valve causes a recharge of the capacitor, and the recharge time is dependent on the values of the capacitor voltage and the line current at the time of firing. A calculating circuit is then adapted, in dependence on the capacitor voltage and the line current, to determine the firing time such that the zero crossings of the capacitor voltage always occur at a certain fixed time after the command signal.

According to one embodiment of the invention, a superordinate control member is adapted for controlling the fundamental component of the capacitor voltage. The superordinate control member then comprises members adapted to form a state quantity, which is dependent on the addition to the capacitor voltage which is achieved by the effect of the semiconductor valve, and, in dependence on the difference between the state signal and a reference value, to control the times for the zero crossings of the capacitor voltages. In this way the invention provides a possibility of control of the effect of the series capacitor at the system frequency, that is, the degree of compensation, and this while at the same time the advantageous SSR damping according to the invention is all the time active.

What characterizes control equipment according to the invention will become clear from the appended claims.

BRIEF DESCRIPTION OF THE DRAWINGS

The invention will be described in greater detail in the following with reference to the accompanying FIGS. 1–11, wherein.

DESCRIPTION OF THE PREFERRED EMBODIMENTS

Figure 1:
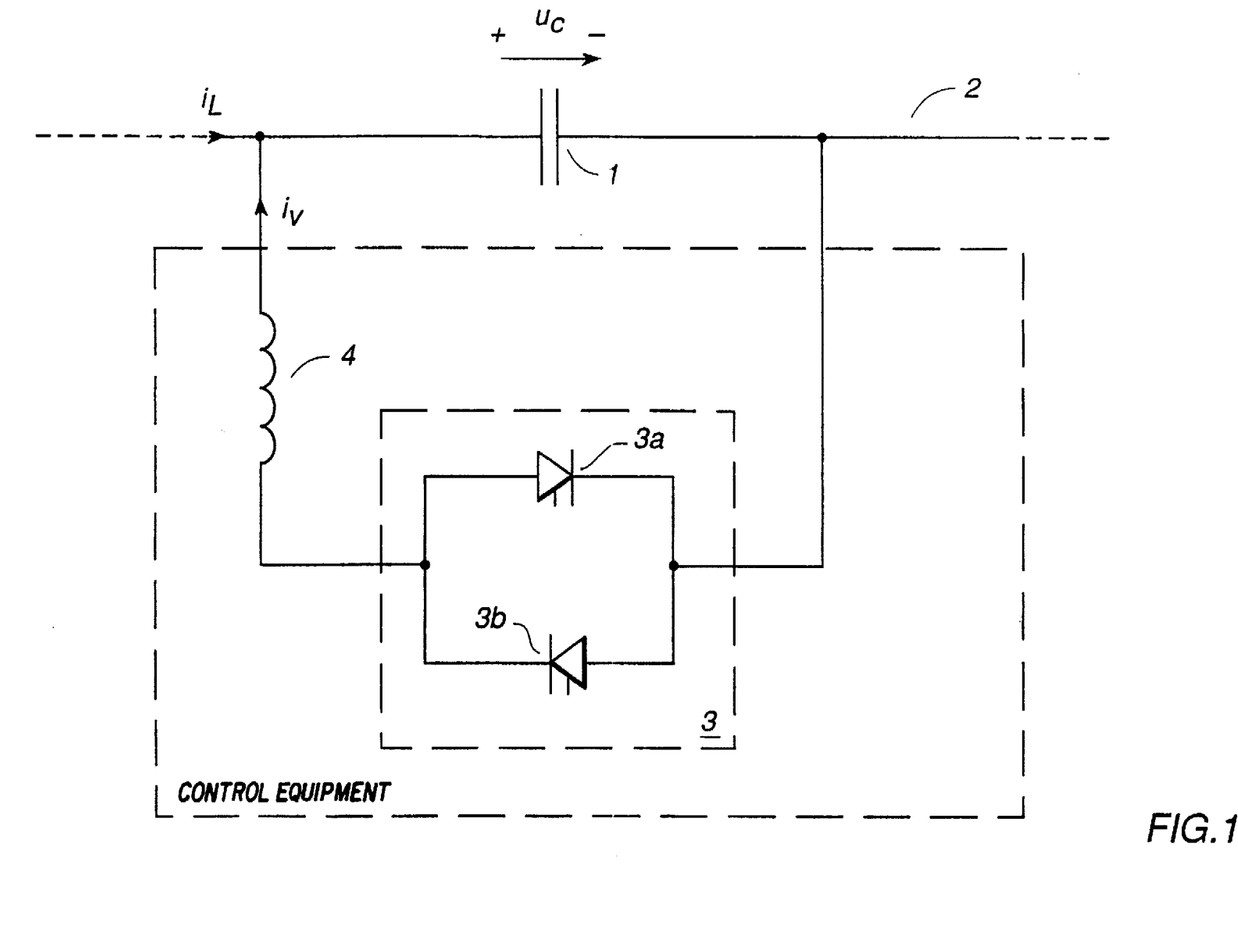
FIG. 1 shows the main components of controllable series capacitor equipment of the kind to which the invention relates.

FIG. 1 shows a series capacitor 1 connected into an electric power line 2. For the sake of simplicity, this figure and the following figures show and describe single-phase lines and capacitor equipment.

In the power line flows the current $i_L$, which is determined by the power line and the network of which it is part. The voltage across the capacitor is designated $u_C$. The system frequency of the power network is $$f_n = \frac{\omega_N}{2\pi}$$

and is normally 50 Hz or 60 Hz. At the system frequency, the capacitor has the capacitive reactance $$x_C = \frac{1}{\omega_N \cdot C}$$

where C is the capacitance of the capacitor.

In parallel with the capacitor, control equipment CE is connected for control of the capacitor. The control equipment comprises a semiconductor valve 3 which is controllable in both directions and which is series-connected to an inductor 4. In the embodiment shown, the semiconductor valve 3 consists of two antiparallel-connected thyristors 3a and 3b.

The inductor 4 has an inductance L and hence, at the system frequency, an inductive reactance $x_v = \omega_N L$. The inductance L of the inductor 4 is so chosen in relation to the capacitance of the capacitor 3 that $x_v < x_C$, which means that the natural frequency of the oscillating circuit formed by the capacitor and the inductor is higher, preferably considerably higher, than the system frequency of the network. Typical values of the natural frequency of the circuit fall within the range 2.5–5 times the power frequency.

Figure 2:
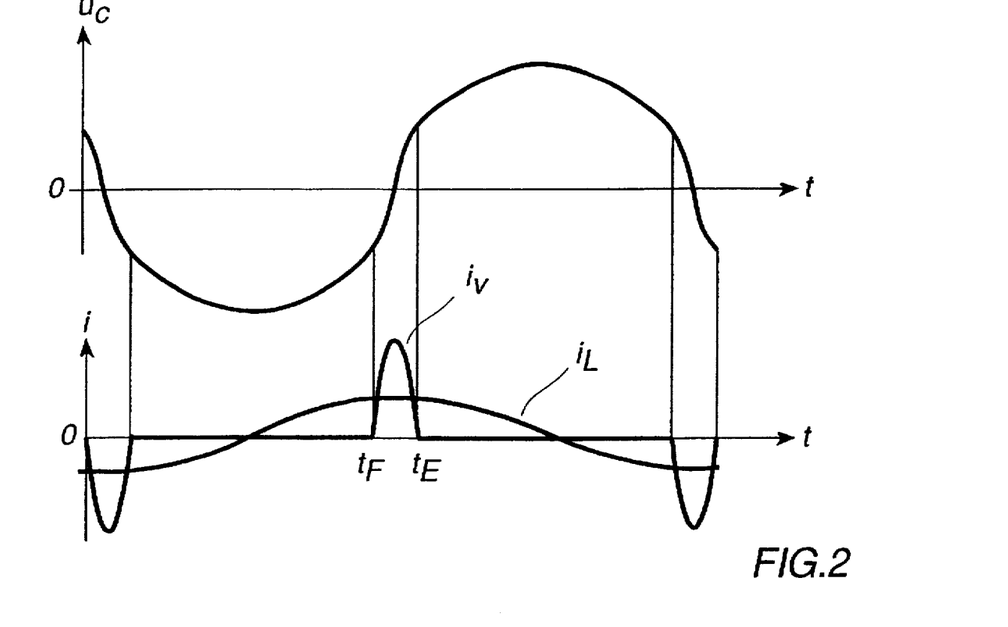
FIG. 2 shows voltage and current plotted against time in equipment according to FIG. 1.

In steady state, the semiconductor valves are conducting in intervals which symmetrically surround the zero crossings of the capacitor voltage. FIG. 2 schematically shows the capacitor voltage $u_C$, the line current $i_L$ and the valve current $i_V$ plotted against time t. At, for example, the zero crossing at which the capacitor voltage changes signs from a negative to a positive sign, the semiconductor valve (valve 3b) is fired at the time $t_F$ and a current pulse $i_V$ traverses the circuit formed by the capacitor, the inductor and the semiconductor valve. At $t=t_E$, the current through the semiconductor valve becomes zero, and the valve expires.

Figure 3:
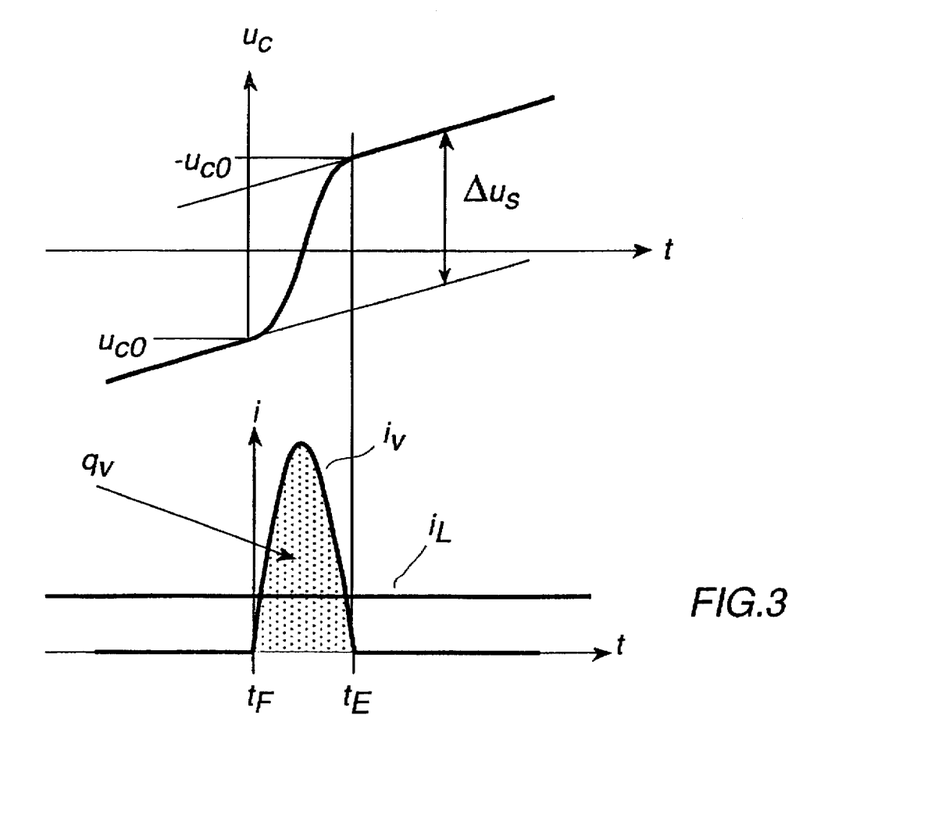
FIG. 3 shows current and voltage during a voltage reversal period.

FIG. 3 shows in more detail the variations with time of the quantities $u_C$, $i_L$ and $i_V$ in connection with the zero crossing of the capacitor voltage. The semiconductor valve is fired at $t=t_F$ and the capacitor voltage $u_C$ then has the value $u_{C0}$. If the losses are neglected, the capacitor voltage has, at the end of the conduction interval of the valve, that is, at $t=t_E$, the value $-u_{C0}$. The voltage is then as great as the voltage at the beginning of the conduction interval but has the opposite polarity. The function of the control equipment is thus to reverse the instantaneous voltage of the capacitor. As is clear from FIG. 3, this means an addition $\Delta u_r$ (sometimes called voltage boost) to the change of the capacitor voltage during the interval $t_F$ to $t_E$ in addition to what is caused by the line current during the same interval. By suitable control of the semiconductor valve, the capacitor voltage may be controlled in this way. Allowing the firing time $f_F$ to occur earlier gives an increased value of the quantity $\Delta u_r$, which may be expressed as an increasing control state of the capacitor. The quantity $\Delta u_r$ may be considered a measure of the control state of the capacitor, and an increase of $\Delta u_r$ gives an increase of the capacitor voltage and of the effective impedance of the capacitor at the system frequency.

Since the reversal of the capacitor voltage takes place at the peak value of the line current, and since the time of the reversal is short in relation to half the period of the line voltage, the line current $i_L$ may be considered to be approximately constant during the voltage reversal process and is shown as a straight line in the figure.

The time integral (the current time area) of the valve current $i_v$ during the reversal process is $q_v$ and it is this charge quantity that gives the capacitor the above-mentioned voltage addition $\Delta u_r$.

In practice, unavoidable losses in the reversal circuit occur. Taking these losses into consideration, the following may be set $$u_c(t_E) = -D \cdot u_c(t_F)$$

where $0<D<1$ is a factor which characterizes the factor of merit of the circuit. The factor D is, in practice, relatively near the value 1 and may, in practice, be considered to be within the interval 0.90–0.95.

When reducing the inductance in that thyristor-controlled inductive branch, which is connected in parallel with the series capacitor, the conduction interval of the thyristors will become increasingly shorter and the peak value of the thyristor current increasingly greater. However, the function to reverse the voltage remains unchanged. It proves that the function "reversal of the capacitor voltage" is a suitable starting-point of the derivation of the interaction between a thyristor-controlled series capacitor and the transmission system in which the capacitor is included.

For analysis of the function of the circuit, in many cases the voltage reversals may be regarded as instantaneous (corresponding to the inductance zero). If such idealized series capacitor equipment is operating on a transmission line with a certain current, the voltage reversals will, in steady state, occur at the zero crossings of the series capacitor voltage and with a frequency which is twice the power frequency.

Figure 4:
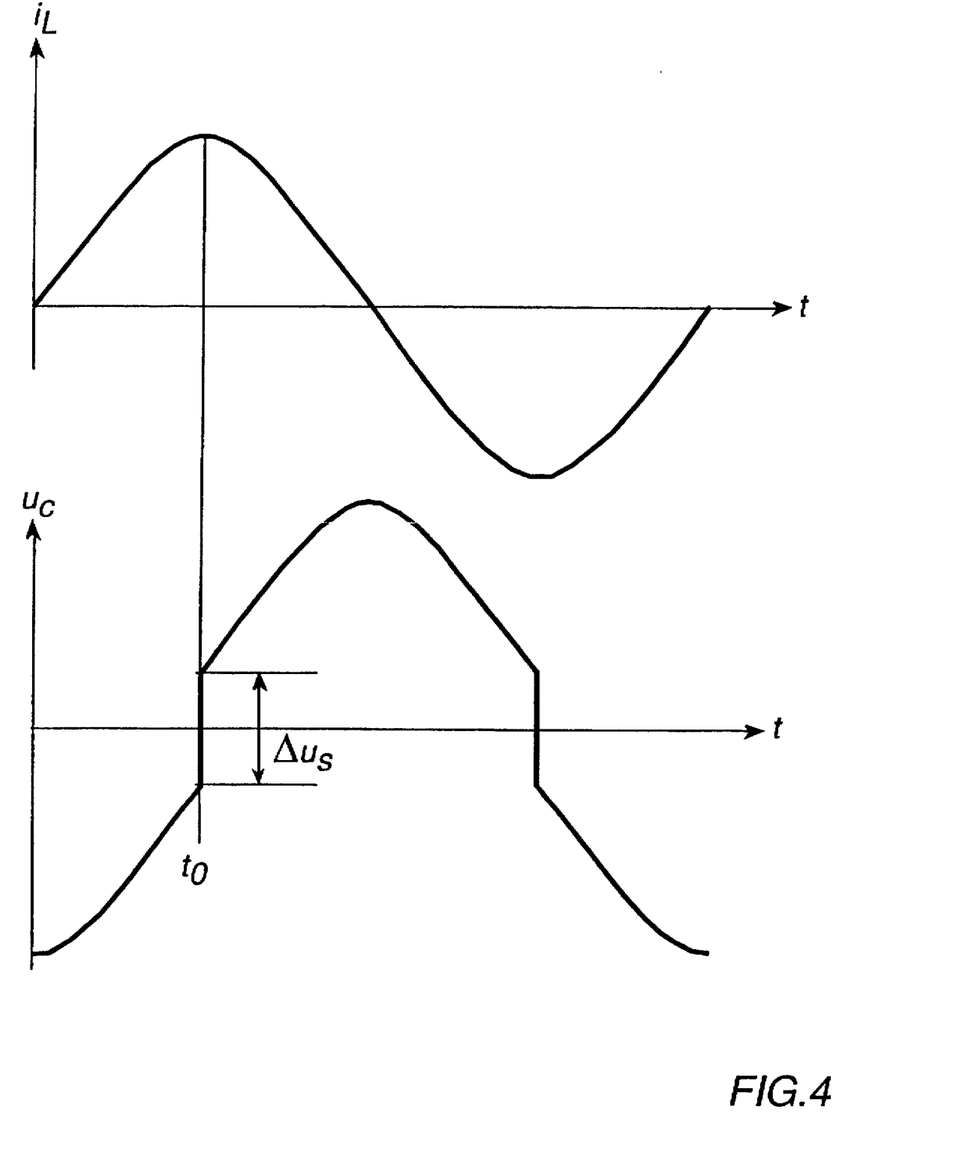
FIG. 4 shows an idealized picture of the voltage and current of the capacitor at a certain control state.

FIG. 4 illustrates the function of such idealized series capacitor equipment. The instantaneous reversal of the capacitor voltage takes place at $t=t_0$, that is at the natural zero crossing of the capacitor voltage (and at the peak value of the line current). The reversal gives the addition (the voltage boost) $\Delta u_r$ to the capacitor voltage $u_C$.

An infinitesimal alternating current $$\Delta i(t) = \Delta \hat{i} \cos \Omega t = Re[\Delta \hat{i} \, e^{j\Omega t}]$$

with the angular frequency $\Omega$, superimposed on the stationary line current, produces an additional voltage $\Delta u$ across the series capacitor. This additional voltage contains a component with the frequency $\Omega$, which may be represented as $$\Delta u(t) = \Delta \hat{u} \cos(\Omega t + \Theta) = Re[\Delta \hat{u} \, e^{j\Theta} e^{j\Omega t}]$$

The quotient $$Z(\Omega) = \frac{\Delta \hat{u} e^{j\Theta}}{\Delta \hat{i}}$$

is then a measure of the apparent impedance which the capacitor equipment (capacitor with associated control equipment) exhibits for applied voltages with the angular frequency $\Omega$. An expression for $Z(\Omega)$ will be derived in the following.

Figure 5:
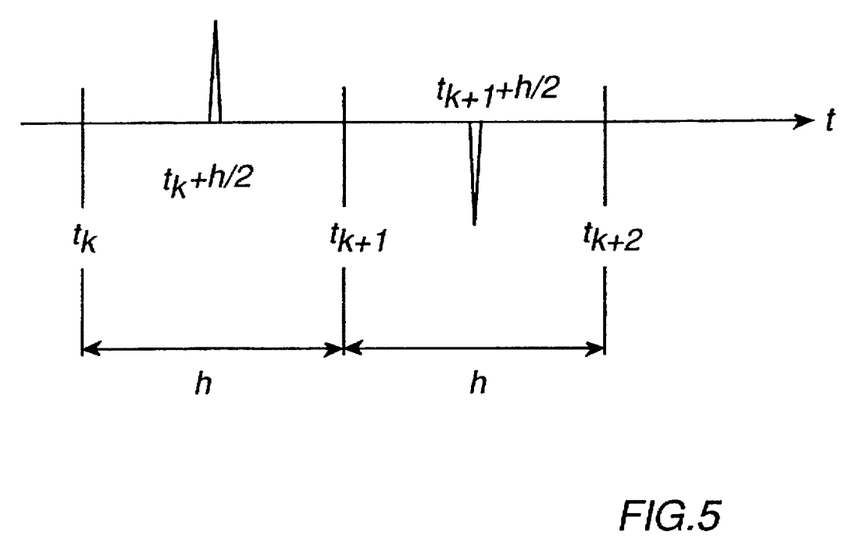
FIG. 5 shows as a background to the derivation of the apparent impedance of the equipment how the times of sampling of the capacitor voltage lie in relation to the firing times of the capacitor voltage.

The derivation is performed in the simplest manner for a discrete system in which the voltage is sampled at times $t_k$, $t_{k+1}$, $t_{k+2}$, etc. The sampling times are located midway between the times when the voltage reversals occur (the voltage at a sampling time is then a good measure of the mean value of the additional voltage during the half-period in question). FIG. 5 shows the sampling times $t_k$, $t_{k+1}$, $t_{k+2}$. The duration of the sampling interval is h, that is, $t_{k+1}-t_k=h$. The voltage reversals occur midway between the sampling times, that is, at $t_k+h/2$, $t_{k+1}+h/2$, etc., and are symbolically shown in the figure as short current pulses.

If the quantities are represented by their normalized values (pu values; per-unit values) the following differential equation applies to the capacitor voltage as a function of the line current in the interval between the reversals $$\frac{1}{\omega_N} \cdot \Delta \dot{u} = x_C \cdot \Delta i$$

where $\omega_N$ is the angular frequency of the network. The following is thus obtained $$\Delta \dot{u} = \omega_N \cdot x_C \cdot Re[\Delta \hat{i} \, e^{j\Omega t}]$$

The duration of the sampling interval is $$h = \frac{1}{2 f_N} = \frac{\pi}{\omega_N}$$

The integration in the interval $$t_k < t < t_k + h/2$$

then gives $$\Delta u \left( t_k + \frac{h}{2} - 0 \right) = \Delta u(t_k) + \omega_N \cdot x_C \cdot \int_{t_k}^{t_k + h/2} Re[\Delta \hat{i} \cdot e^{j\Omega \xi}] d\xi$$

At the time $t=t_k$, the capacitor voltage is reversed. The following is then obtained $$\Delta u \left( t_k + \frac{h}{2} + 0 \right) =$$

$$-D \cdot \left\{ \Delta u(t_k) + \omega_N \cdot x_C \cdot \int_{t_k}^{t_k + h/2} Re[\Delta \hat{i} \cdot e^{j\Omega \xi}] d\xi \right\}$$

where the factor D, as mentioned above, represents the losses of the circuit. Renewed integration, now in the interval $$t_k + h/2 < t < t_{k+1} = t_k + h$$

gives $$\Delta u(t_k + h) =$$

$$-D \cdot \left\{ \Delta u(t_k) + \omega_N \cdot x_C \cdot \int_{t_k}^{t_k + h/2} Re[\Delta \hat{i} \cdot e^{j\Omega \xi}] d\xi \right\} +$$

$$\omega_N \cdot x_C \cdot \int_{t_k + h/2}^{t_k + h} Re[\Delta \hat{i} \cdot e^{j\Omega \xi}] d\xi = -D \cdot \Delta u(t_k) +$$

$$\omega_N \cdot x_C \cdot Re \left\{ \Delta \hat{i} \cdot (-D + e^{j\Omega h/2}) \cdot e^{j\Omega t_k} \cdot \int_0^{h/2} Re[\Delta \hat{i} \cdot e^{j\Omega \xi}] d\xi \right\} =$$

$$-D \cdot \Delta u(t_k) + \omega_N \cdot x_C \cdot Re \left\{ \Delta \hat{i} \frac{(e^{j\Omega h/2} - D)(e^{j\Omega h/2} - 1)}{j\Omega} e^{j\Omega t_k} \right\}$$

Now, if $\Delta u(t_k)$ is represented according to $$\Delta u(t_k) = Re\{\Delta \hat{u} \, e^{j\Theta} e^{j\Omega t_k}\}$$

the following equation is obtained $$\Delta\hat{u} \cdot e^{j\theta} \cdot (e^{j\Omega h} + D) = \frac{\omega_N}{\Omega} \cdot (-jx_C) \cdot (e^{j\Omega h/2} - D) \cdot (e^{j\Omega h/2} - 1) \cdot \Delta\hat{i}$$

The apparent impedance then becomes $$Z(\Omega) = \frac{\Delta\hat{u} \cdot e^{j\theta}}{\Delta\hat{i}} = \frac{\omega_N}{\Omega} \cdot (-jx_C) \cdot \frac{(e^{j\Omega h/2} - D)(e^{j\Omega h/2} - 1)}{(e^{j\Omega h/2} + D)} =$$

$$\frac{\omega_N}{\Omega} \cdot (-jx_C) \cdot \frac{(e^{j(\Omega/\omega_N)\pi/2} - D) \cdot (e^{j(\Omega/\omega_N)\pi/2} - 1)}{(e^{j(\Omega/\omega_N)\pi} + D)}$$

When the capacitor circuit is free of losses, D=1 and the expression is simplified to $$Z(\Omega) = \frac{\omega_N}{\Omega} \cdot jx_C \cdot \frac{1 - \cos\frac{\Omega}{\omega_N}\frac{\pi}{2}}{\cos\frac{\Omega}{\omega_N}\frac{\pi}{2}}$$

from which expression it is clear that for this case the apparent reactance becomes inductive within the whole range $\Omega < \omega_N$, that is, for the whole frequency range where subsynchronous resonance may occur. Further, it is clear that the apparent resistance is zero.

Figure 6A:
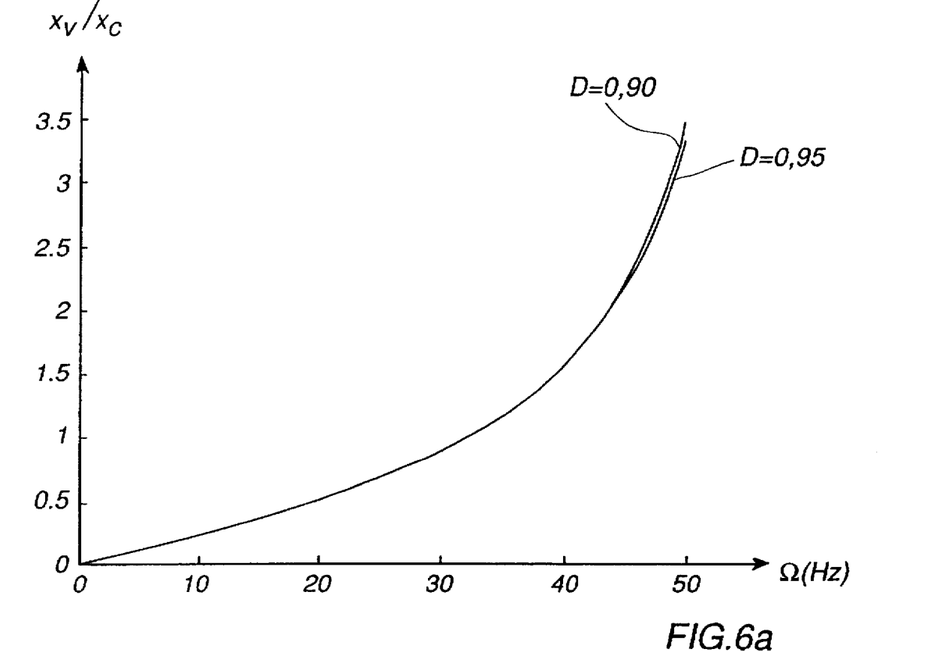
FIG. 6 shows how the apparent impedance of the capacitor equipment varies with the frequency within the subsynchronous frequency range.
Figure 6B:
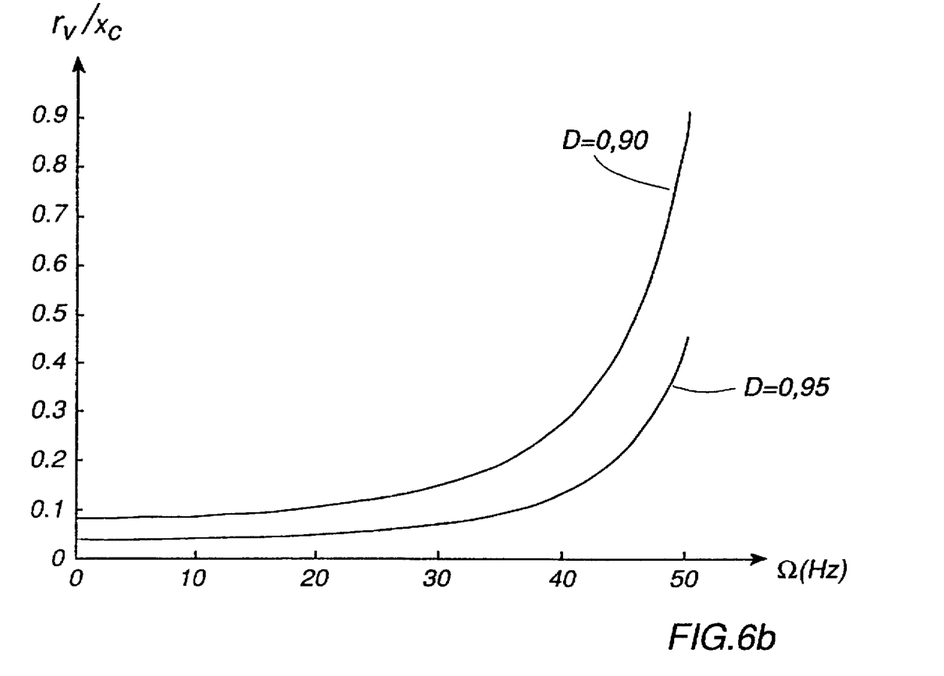

In practice, the losses of the equipment cannot simply be neglected. FIG. 6a and FIG. 6b, however, show the apparent reactance and the apparent resistance, respectively, for two assumed values of the circuit losses, namely, for D=0.90 and for D=0.95, which together with the case treated above, D=1, cover the entire range of variation of the quantity D which is likely to occur in practice. The calculations are made for the system frequency 60 Hz, that is, for $\omega_N = 2\pi \cdot 60$ and for the frequency range $0 < \Omega < 50$ Hz and thus cover with a good margin that frequency range 15 Hz$<\Omega<$45 Hz where subsynchronous resonance may occur. FIG. 6a shows the quotient $x_v/x_c$ where $x_v$ is the apparent reactance and $x_c = 1/\omega_N C$.

FIG. 6b shows the quotient $r_v/x_c$ where $r_v$ is the apparent resistance. As is clear from the curves, the apparent reactance $x_v$ is positive, that is inductive, within the entire frequency range in question.

The above section thus shows that a thyristor-controlled series capacitor, in which the capacitor voltage is reversed at equidistant times, exhibits an inductive characteristic within the whole range which is of interest to subsynchronous resonance oscillations. However, the derivation is made on the assumption that the inductance of the inductor is so low that the reversal of the capacitor voltage takes place in a negligibly short time.

In practice, the above-mentioned inductance cannot be neglected, and the voltage reversal will then not take place instantaneously. The conduction interval of the semiconductor valve will have a finite duration, which is dependent on the relationship between on the one hand the voltage of the capacitor upon firing of the valve and on the other hand the value of the line current during the conduction interval of the valve, and on the natural frequency of the LC circuit which is constituted by the series capacitor and the inductance of the branch. It can, however, be shown that, if the control of the firing of the valve is modified such that the time of the zero crossings of the capacitor voltage is maintained independent of variations in these variables, the apparent impedance will maintain its inductive character.

The derivation above has been made solely on the basis of the principle of equidistant voltage reversals, and no system parameters, such as line impedances, etc., occur in the relationships. Thus, the curves in FIG. 6a and FIG. 6b apply independently of the transmission system and of the magnitude of the fundamental current component.

Figure 7:
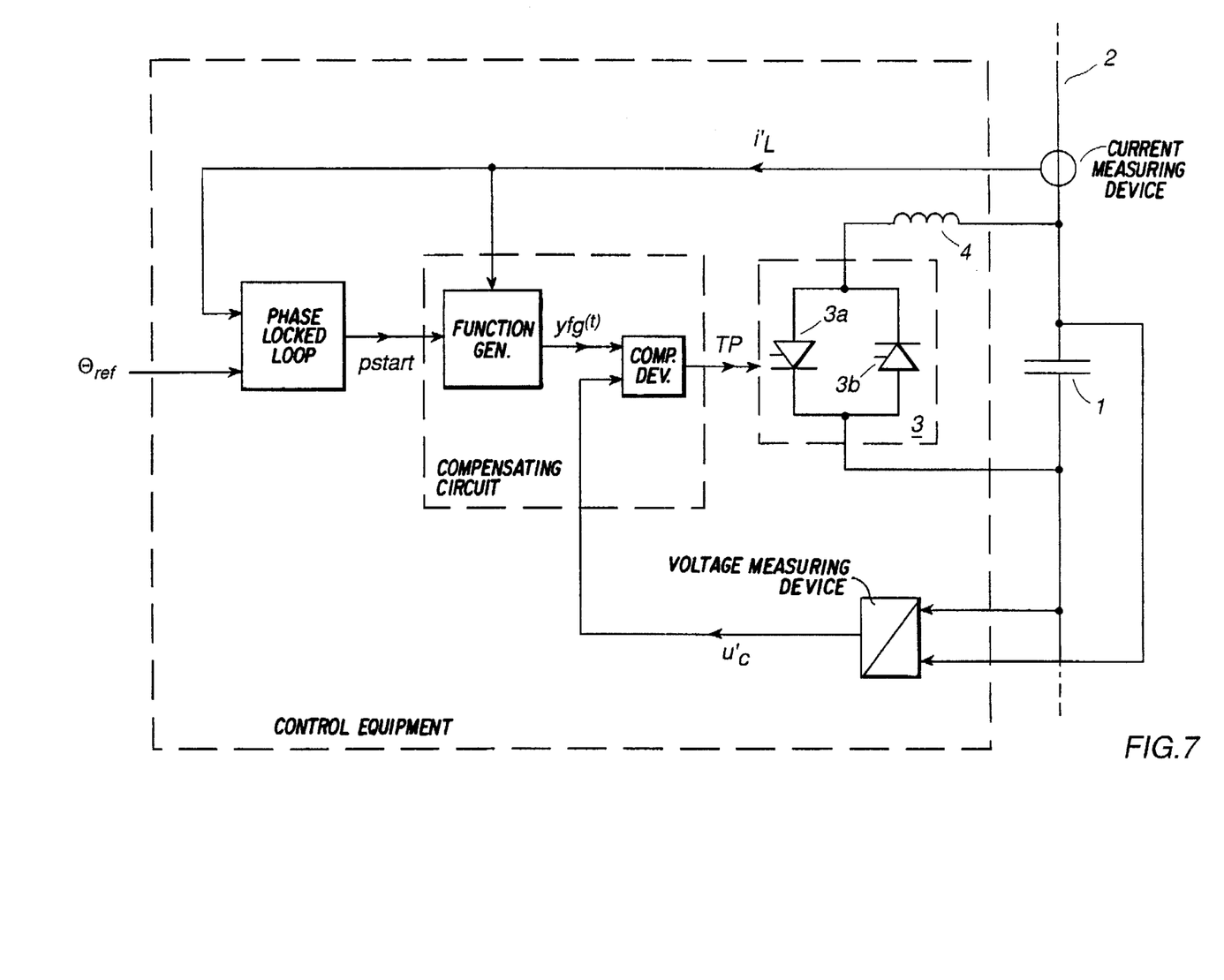
FIG. 7 shows the principle of control equipment according to the invention.

FIG. 7 shows the fundamental configuration of control equipment CE according to the invention, which is connected to a series capacitor 1, connected into a power line 2, for control of the capacitor. The control equipment comprises a two-way valve 3 and an inductor 4, which, connected in series with each other, are connected in parallel with the capacitor 1. A current measuring device IM, for example a current transformer or a current measuring device with optical signal transmission, is connected into the power line and delivers a measured signal $i_L'$ to the control equipment corresponding to the line current $i_L$. A voltage measuring device UM, for example a voltage divider with optical signal transmission or a voltage transformer, is connected across the capacitor and delivers a measured signal $u_C'$ corresponding to the capacitor voltage $u_C$.

The control equipment comprises a phase-locked circuit (Phase-Locked Loop) PLL, which by the signal $i_L'$ is synchronized with the line current $i_L$. The circuit supplies equidistant command pulses $p_{start}$ with a frequency which is twice the system frequency of the network in which the power line 1 is included. The phase position of the command pulses in relation to the line current $i_L$ is determined by a phase reference signal $\theta_{ref}$. This signal is obtained preferably from a superordinate control system, which controls the properties of the series capacitor equipment at the fundamental tone of the system frequency (see more detailed description below with reference to FIG. 10).

The phase-locked loop PLL is provided with suitable filter means to limit or eliminate the effect of the subsynchronous currents. The bandwidth of these filter means may be made so low that the subsynchronous components are practically entirely eliminated, but in practice it has proved to be advantageous to have a relatively high bandwidth. The filter means may, for example, consist of a low-pass filter arranged in the signal path of the phase-difference signal formed in the phase-locked loop.

The command pulses $p_{start}$ are supplied, as are the measured signals $u_C'$ and $i_L'$, to a compensating circuit TC. Based on the measured instantaneous values of capacitor voltage and line current, this circuit corrects the varying delay (between the firing of the thyristor valve and the zero crossing of the capacitor voltage) which arises because of the finite reversal time of the thyristor-inductor-capacitor circuit. The compensating circuit delivers firing pulses TP to the thyristor valve.

It can be shown that the duration $t_1$ of the conduction interval of the thyristor valve is determined from the relationship $$\lambda \cdot \omega_N \cdot t_1 = 2\xi$$

where $$\lambda = \sqrt{x_C/x_V}$$

$$\xi = \arctan\frac{-u_{CO}}{(x_C i_L)/\lambda}$$

and $-u_{CO}$ is the capacitor voltage at the moment of firing.

Figure 8:
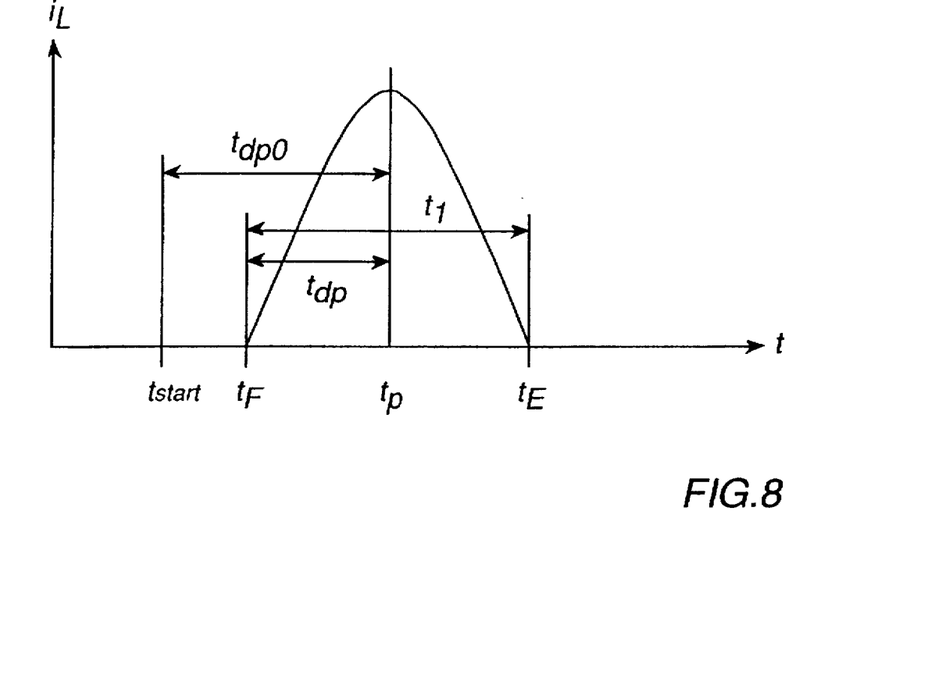
FIG. 8 shows as a function of time in connection with a firing of the semiconductor valve, the command signal and the current through the semiconductor valve.

As will be clear from FIG. 8, the following applies for the time $t_{dp}$ between the firing of the valve at $t=t_F$ and the peak value of the current at $t=tp$ $$t_{dp} = t_1/2$$

that is, $$t_{dp} = \frac{\xi}{\lambda \cdot \omega_N}$$

The time $t_{dp}$ will have its highest value $t_{dp0}$ at a high capacitor voltage and/or a low line current, and the quantity $\xi$ then has its greatest value $\xi_{max} = \pi/2$, that is, $$t_{dp0} = \frac{\pi/2}{\lambda \cdot \omega_N}$$

According to the invention, the zero crossings of the capacitor voltage, that is, the times of the maximum values of the valve current, shall be equidistant, that is, $$t_F = t_{start} + t_{dp0}$$

From these conditions, the relationship is obtained which defines the firing time $t_F$:

$$\frac{xcI_L(t_F)}{\lambda} \tan\left[\frac{\pi}{2} - \lambda\omega_N(t_F - t_{start})\right] = -u_C(t_F)$$

The compensating circuit TC includes a function generator FG which is adapted, in dependence on the magnitude of the line current and starting at each starting pulse $p_{start}$, to generate a function $$y_{fg}(t) = \frac{xcI_L(t)}{\lambda} \tan\left[\frac{\pi}{2} - \lambda\omega_N(t - t_{start})\right]$$

The value of this function is supplied to a comparison device CM which is adapted to continuously compare this function with the instantaneous values $-u_C(t)$ of the capacitor voltage. At $t=t_F$, the value of the function and the capacitor voltage are equally great, and the device CM is adapted to then supply a signal TP for firing the thyristor valve.

Figure 9:
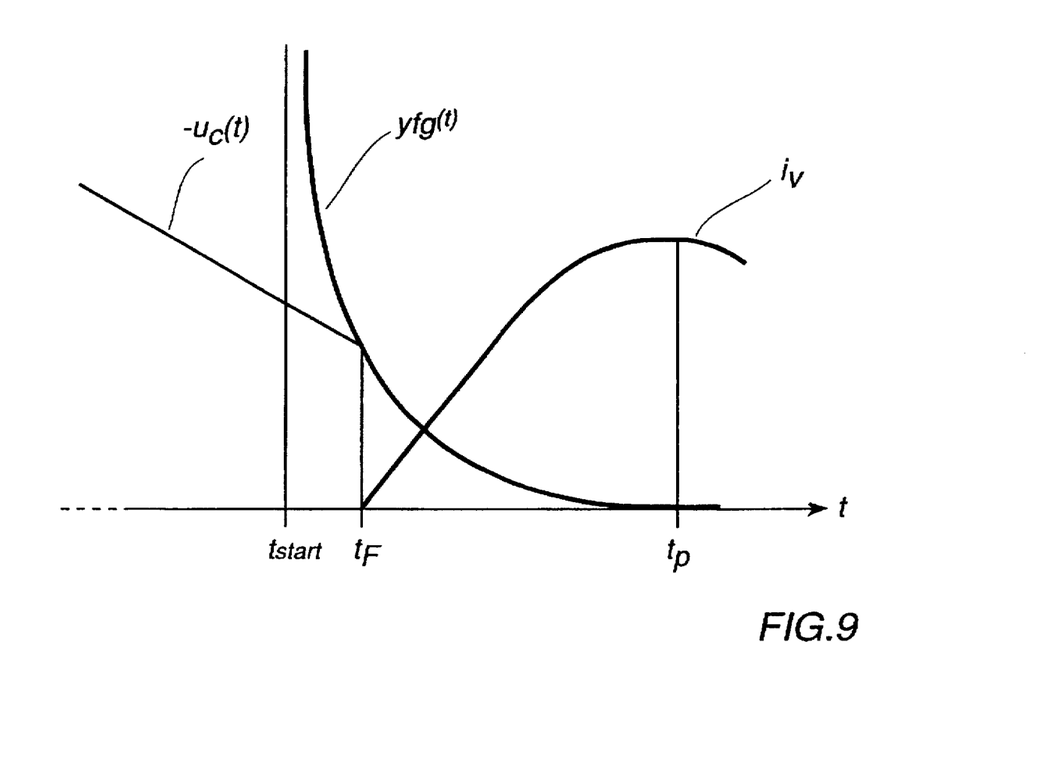
FIG. 9 shows the function of that part of the control equipment which determines the time of firing of the semiconductor valve.

The variation of the function $y_{fg}(t)$ and of the capacitor voltage $-u_C$ is shown in FIG. 9.

The line current $i_L$, the measured value of which is included in the above relationships, need not be measured continuously. The firing of the valve is always performed near the zero crossing of the capacitor voltage, that is, near the peak value of the line current. Since the current then varies slowly, one single sampling of $i_L$, for example at $t=t_{start}$, may provide sufficient accuracy for determining $t_F$. The determination of the firing time may, if desired, be refined by correcting the measured value of the line current taking into account the normally sinusoidal variation of the line current.

In the control method described above with reference to FIGS. 7-9, the voltage reversals (the zero crossings of the capacitor voltage) of the capacitor will always occur at equidistant times given by the phase-locked loop, independently of the magnitude of the capacitor voltage, that is, of the control state of the capacitor. Steady state occurs if the total net charge, supplied by the line current to the capacitor between two voltage reversals, is zero. If this condition is fulfilled, the capacitor voltage has the same value immediately before a voltage reversal as immediately after the preceding reversal.

If, for example, the zero crossings occur somewhat earlier in relation to the times which correspond to the steady state, the line current will, during each interval between two reversals, give a positive net addition to the charge of the capacitor, and the capacitor voltage will continuously increase. If, on the other hand, the zero crossings occur somewhat later in relation to the times which correspond to the steady state, the line current will, during each interval between two reversals, give a negative net addition to the charge of the capacitor, and the capacitor voltage will continuously decrease. A small deviation of the firing times from the times which correspond to steady state will thus with an integrating effect give an increasing or a decreasing control state of the capacitor. The control equipment shown in FIG. 7 is therefore supplemented, according to a preferred embodiment, by a superordinate control circuit which maintains the capacitor voltage, that is, the control state thereof, at the desired level.

Figure 10:
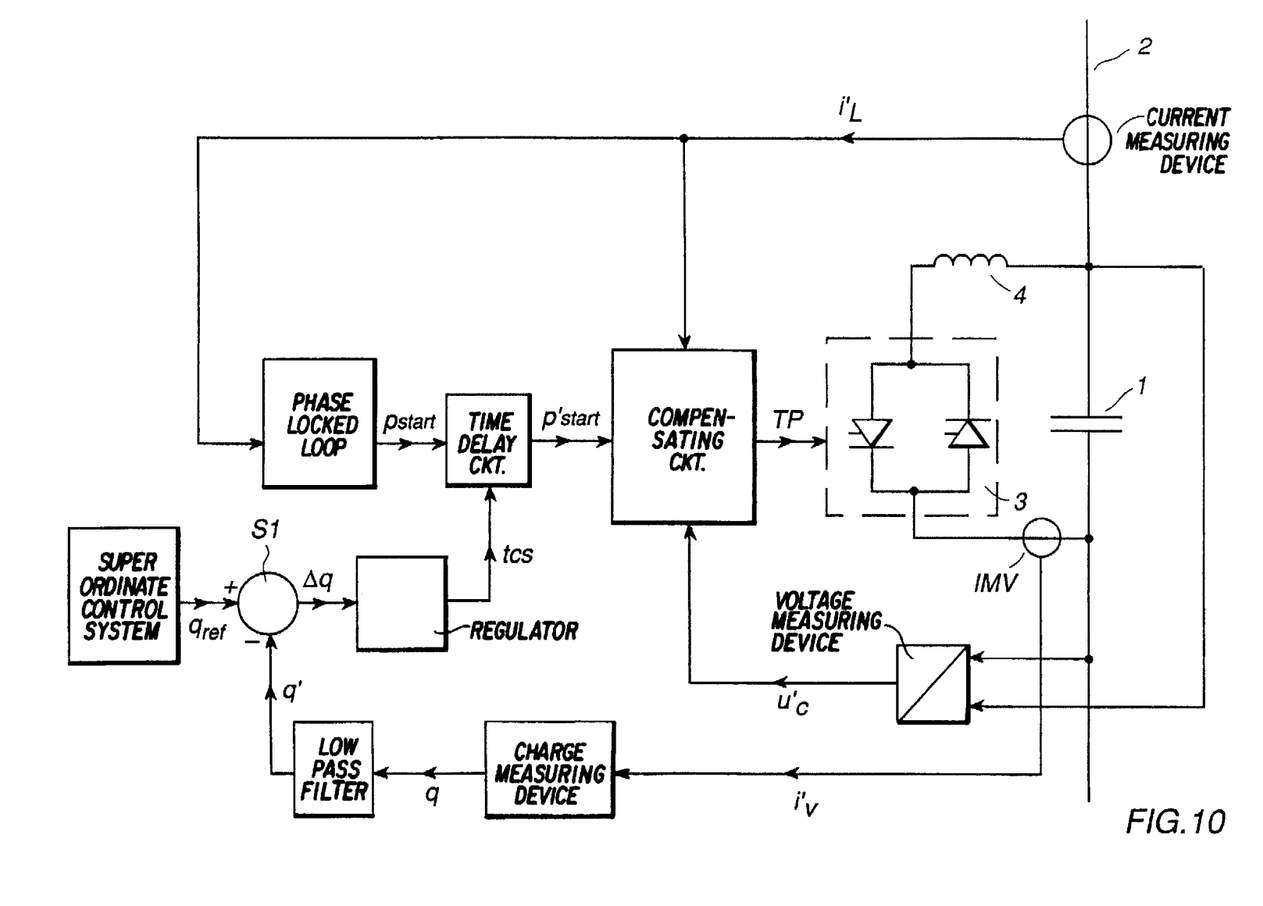
FIG. 10 shows an alternative embodiment of equipment according to the invention, wherein a control system is adapted for control of the control state of the capacitor equipment.

FIG. 10 shows such control equipment. A second current measuring device IMV delivers a measured signal $i_v'$ corresponding to the valve current $i_v$. This signal is supplied to a charge measuring device QM. In this device, by integration of the valve current during the reversal process, a signal q is formed which corresponds to the time integral of the valve current, that is, the change of the charge of the capacitor and hence of the voltage thereof, caused by the reversal. The quantity q is thus a measure of the control of the capacitor (cf. FIG. 3 with associated description). To eliminate such components in the measured signal as are caused by subsynchronous resonance phenomena, the measured signal q is passed through a low-pass filter LP with such a selected characteristic that components of SSR frequency are eliminated. In a summator S1 the filtered signal q' is compared with a reference signal $q_{ref}$ which is obtained from a superordinate control system SR and which constitutes a reference for the control state of the capacitor. The deviation $\Delta q$ is supplied to a regulator QR, the output signal tcs of which in turn is supplied to a time-delay circuit TF, which delays the pulses $p_{start}$ obtained from the phase-locked loop proportionally to the output signal of the regulator and in such a way that a positive value of $\Delta q$ results in the firing times occurring earlier and negative value results in the firing times occurring later. The amplification of the circuit TF is influenced by the amplitude of the line current and is, for example, inversely proportional to the absolute value of the line current. Because of the above-mentioned inherent integrating function of the system, the regulator QR may be a pure proportionality regulator. In practice, however, it has proved to be suitable to design the regulator as a PI regulator with a smaller integrating part, among other things to compensate for the effect of circuit losses. In this way, that capacitor voltage/control state which is given by the reference value $q_{ref}$ is automatically obtained and maintained. The pulses obtained from the time-delay circuit TF are designated $P'_{start}$.

The superordinate control system SR is not part of the invention but may be a regulator or control equipment for control of the power system in which the power line and the series capacitor in question are included. The signal $q_{ref}$ may thus be varied by the superordinate system, for example in dependence on the desired SSR damping, for damping electromechanical low-frequency oscillations in the network, for controlling the power flow in the network, or quite simply for setting a certain desired reactance in the series capacitor.

In certain cases, there is no wish to use the control of the series capacitor for any other purpose than to counteract SSR oscillations. The control state of the capacitor (the voltage boost) may then be adapted only in view of what is required for this purpose. In general, it is then desirable to maintain the control state as low as possible to reduce the harmonics in the capacitor voltage and to reduce the thermal stresses on the semiconductor valves and on the capacitor.

To counteract an SSR oscillation, however, a certain lowest level of the capacitor voltage is required. According to one embodiment of the invention, therefore, the control system is designed such that, during undisturbed operation, it maintains the control state at a very low value—possibly zero—but, on the occurrence of an SSR oscillation, if need arises, raises the control state to a sufficient degree for the system to give the desired SSR damping.

As is clear from FIG. 9, for low capacitor voltages, no intersectional point is obtained between the curve $-u_c(t)$ and the curve $y_{fs}(t)$ during the interval $t_{start}-t_p$ and, therefore, no firing of the semiconductor valve. To obtain the desired control function with equidistant zero crossings of the capacitor voltage, the control state and hence the capacitor voltage must be so high that an intersectional point is obtained during the time interval mentioned.

Figure 11:
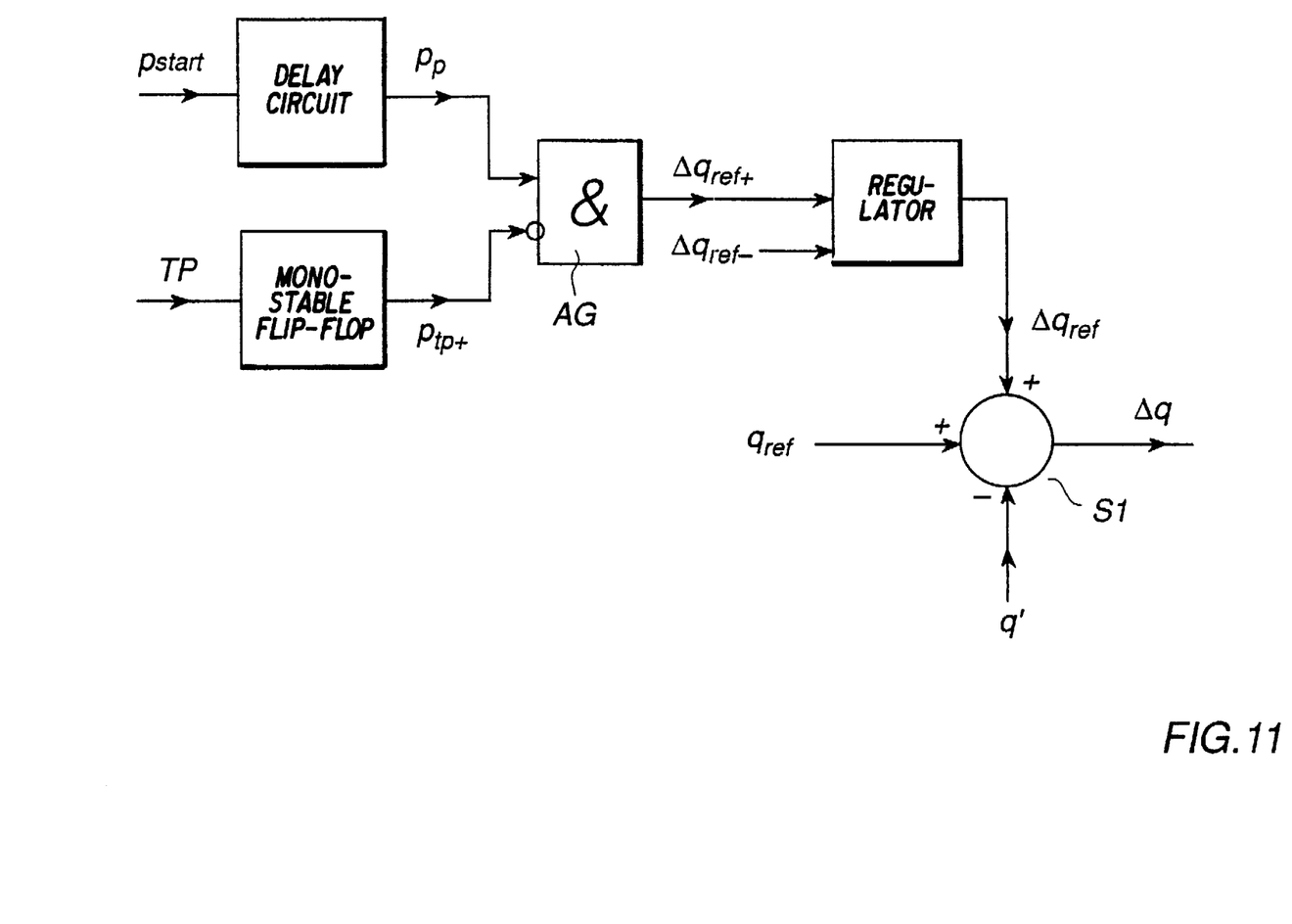
FIG. 11 shows an alternative embodiment of the control equipment, wherein the control state of the capacitor is normally low but is increased when there is a need of SSR damping.

FIG. 11 shows additional equipment which, together with the equipment shown in FIG. 10, provides the above-mentioned function. The pulses $p_{start}$ from the phase-locked loop PLL are supplied to a delay circuit FC with the time delay $t_{dp0}$ and this circuit delivers the pulses $p_p$ at the times $t_p$ for the desired equidistant zero crossings of the capacitor voltage $u_c$. The pulses are supplied to an input of an AND circuit AG. The firing pulses TP from the compensating circuit TC are supplied to a monostable flip-flop MV with the return time $t_{dp0}$. The flip-flop thus delivers signals $p_{tp+}$ starting in each received firing pulse and with the duration $t_{dp0}$. These signals are supplied to a negative input of the AND circuit AG. If the capacitor voltage is so low that no intersectional point has been obtained between $-u_c$ and $y_{fs}$, the signal $p_{tp+}$ is zero at $t=t_p$, and the AND circuit delivers a pulse $\Delta_{qref+}$ with a suitable amplitude which is supplied to a regulator DQR with PI function. The output signal $\Delta_{qref}$ of the regulator is supplied to the summator S1 in FIG. 10 and is assumed to be zero. The input signal $q_{ref}$ to the summator has the value which corresponds to the control state desired during undisturbed operation, thus preferably zero or a low value. The pulse $\Delta q_{ref+}$ provides an instantaneous positive addition to the output signal of the regulator, which addition acts as an instantaneous increase of the reference $q_{ref}$ by the amount $\Delta q_{ref}$. If no intersectional point is obtained after the next pulse $p_{start}$ either, and hence no firing pulse, the increase of $q_{ref}$ is repeated until firing pulses are obtained and hence the desired SSR-damping control of the capacitor. A weakly negative signal $\Delta q_{ref-}$ is supplied to a second input of the regulator DQR and provides, because of the integrating component of the regulator characteristic, a slow reduction of the reference voltage addition $\Delta q_{ref}$, which causes this addition to be reduced to zero after cessation of an SSR oscillation.

As shown above, with the aid of control equipment according to the invention, series capacitor equipment connected into a power line may be caused to exhibit an inductive impedance within the entire frequency range where SSR oscillations may occur. This means that the power line vis-à-vis the remainder of the network operates, from the SSR point of view, as an uncompensated line, and hence SSR oscillations will be efficiently counteracted. This advantageous function is obtained independently of electrical data of the power line and the surrounding network. The efficient SSR damping therefore becomes independent of variations in the configuration and data of the line or the remainder of the power network, and since precise knowledge of line or network data is not required, existing series capacitor equipment may be simply supplemented by control equipment according to the invention, or existing control equipment by redesigned according to the invention.

The SSR damping is obtained solely through control actions, and it is therefore, in practice, free of losses. These advantages are obtained while at the same time a rapid and lossless control of the effective capacitance of the capacitor equipment at the system frequency of the network is made possible.

The embodiments of the invention described above are only examples, and control equipment according to the invention may be designed in a plurality of alternative ways.

Thus, the inductor 4 may be connected into the power line 2 in series with the capacitor 1, the semiconductor 3 thus being connected in parallel with the series connection of the inductor and the capacitor. As shown in FIGS. 2 and 3 in the Swedish published patent application 465 596 mentioned above, an inductor may be connected in series with each one of two oppositely directed parallel-connected semiconductor valves, or the semiconductor valve or both the valve and the inductor may be connected to the capacitor with the aid of a transformer for adaptation of the voltage and current levels of these components.

In the examples described above, the semiconductor valve consists of two antiparallel-connected thyristor valves equipped with conventional thyristors. Alternatively, the semiconductor elements included in the valves may consist of other semiconductor elements, for example gate turn-off thyristors (GTO thyristors) or high-power transistors.

For the sake of simplicity, only single-phase designs of control equipment according to the invention are described above. However, the invention is primarily intended for use in three-phase power transmission lines. Each phase of the line may then be provided with separate control equipment of the kind described above, in which case the control members for control of the firing of the semiconductor valves may to a greater or lesser extent be common for the three phases.

The control members for control of the firing of the semiconductor valves may be designed in many other ways that those described above. Suitably, at least certain parts, for example the function generator FG in FIG. 7, may consist of an appropriately programmed microprocessor or computer.

The quantities, for example the capacitor voltage, the line current and the reversed capacitor charge, which are used for control of the series capacitor may be obtained in other ways than what is described above. Generally, these quantities may be formed or calculated from other measured quantities. The above embodiments thus show how the capacitor voltage is measured directly across the capacitor. Alternatively, this voltage may be measured across the semiconductor valve, the voltage of which prior to firing of the valve is identical with the capacitor voltage. Instead of forming a measure of the reversed charge q (and hence the control state) by integration of the valve current, as described above, this charge may be determined by measuring the difference between the capacitor voltage before and after the reversal and by subtracting, from the capacitor charge corresponding to this voltage difference, the charge addition provided by the line current during the voltage reversal interval.

In the embodiments described above, the control equipment according to the invention is connected across the whole series capacitor. A series capacitor comprises in a known manner a large number of series- and parallel-connected capacitor elements, and these may be regarded as constituting two capacitors connected in series with each other. Control equipment according to the invention may be connected in parallel with only one of these parts, which makes possible a narrower dimensioning of the control equipment. Through the control, an inductive characteristic within the SSR range is then only attained in this part, whereas the other capacitor part has a purely capacitive characteristic both at the system frequency and within the SSR range. The reduction of the total capacitive impedance which is obtained in this way may, however, be sufficient to counteract SSR oscillations to the desired extent.

With reference to FIG. 10 above, a regulator has been described which controls the additional voltage which is achieved by the reversal of the capacitor charge. Alternatively, the total voltage of the capacitor may be controlled, that is, the sum of the additional voltage and the capacitor voltage caused by the line current.

I claim:

1. Control equipment for a series capacitor connected into an electric transmission line for carrying a current having a fundamental component having a fundamental tone frequency, said equipment comprising:

a semi-conductor valve and an inductor connected in series with each other and in parallel with said capacitor, said semi-conductor valve being controllable in both directions, and said inductor forming, together with said capacitor and said semi-conductor valve an oscillating circuit in which the capacitor has a voltage ($u_c$) exhibiting periodic zero-crossing times ($t_p$);

control members responsive to the current in the transmission line and voltage across the capacitor for firing the semi-conductor valve at controllable firing times ($t_F$) such that the periodic zero crossing times of the capacitor voltage are substantially equidistant, thereby causing the apparent impedance of the oscillating circuit to appear inductive with respect to components having a frequency below the frequency of the fundamental component;

means producing equidistant short pulses as a function of the phase of the line frequency;

means for producing a firing time signal for firing semi-conductor in dependence on the line current and the capacitor voltage such that the time between the short pulses and zero crossings of the capacitor voltage becomes substantially constant.

2. Control equipment according to claim 1, wherein the control members further comprise compensating members for compensation of the firing times ($t_F$) for such variations of the times ($t_p$) for the zero crossings of the capacitor voltage which are caused by variations in the operating conditions of the capacitor.

3. Control equipment according to claim 2, the compensating members are adapted to be supplied with state quantities ($u'_c$, $i'_L$) which correspond to the voltage across the capacitor and the current in the power line and to compensate the firing times for variations in these quantities.

4. Control equipment according to claim 1, wherein the control members further comprise a command-signal-generating member for delivering equidistant command signals which are substantially independent of SSR components in the line current, to initiate the firing of the semi-conductor valve.

5. Control equipment according to claim 4, wherein the command-signal-generating member comprises a phase-locked loop controlled by the power line current ($i_L$).

6. Control equipment according to claim 4, wherein the command-signal-generating member delivers command signals with a definite phase position in relation to the fundamental component of the power line current.

7. Control equipment according to claim 5, wherein the command-signal-generating member delivers command signals with a definite phase position in relation to the fundamental component of the power line current.

8. Control equipment according to claim 1, wherein the control members comprise members for firing the semiconductor valve at the times determined by the relationship:

$$(X_c I_L(t_F)/\lambda)\, \tan\, [\pi/2 - \lambda\omega_N(t_F - t_{start})] + u_c(t_F) = 0$$

where $t_F$ is the time for firing the semiconductor valve $t_{start}$ is the time for a command signal $X_c$ is the reactance of the capacitor at the fundamental tone frequency of the power line $I_L(t_F)$ is the current in the power line at the firing time $t_F$ $\lambda$ is the quotient between the natural frequency of the oscillation circuit, formed by the capacitor and the inductor, and the fundamental tone frequency of the power line $\omega_N$ is the fundamental tone frequency of the power line $u_c(t_F)$ is the capacitor voltage at the firing time $t_F$.

9. Control equipment according to claim 1, further comprising a superordinate control member for controlling the fundamental component of the capacitor voltage, wherein the superordinate control member comprises members for forming a state quantity (q') which depends on the capacitor voltage and, in dependence on the difference ($\Delta q$) between the state quantity and a reference value ($q_{ref}$), to control the times for the zero crossings of the capacitor voltage.

10. Control equipment according to claim 9, further comprising bandwidth-limiting members for reduction of the influence of subsynchronous components, present in the power line current ($i_L$) on the state quantity (q').

11. Control equipment according to claim 9, further comprising members for forming the state quantity by determination of the current-time area of that current pulse width which flows through the valve after firing the semiconductor valve.

12. Control equipment according to claim 9, further comprising members (FC, MV, AG, DQR) for increasing the control state (q) of the capacitor in dependence on detected subsynchronous oscillations.

13. Control equipment according to claim 9, further comprising members for forming the state quantity by determination of the current-time area of that current pulse which flows through the valve after firing the semiconductor valve.

* * * * *